United States Patent Office 2,916,681
Patented Dec. 8, 1959

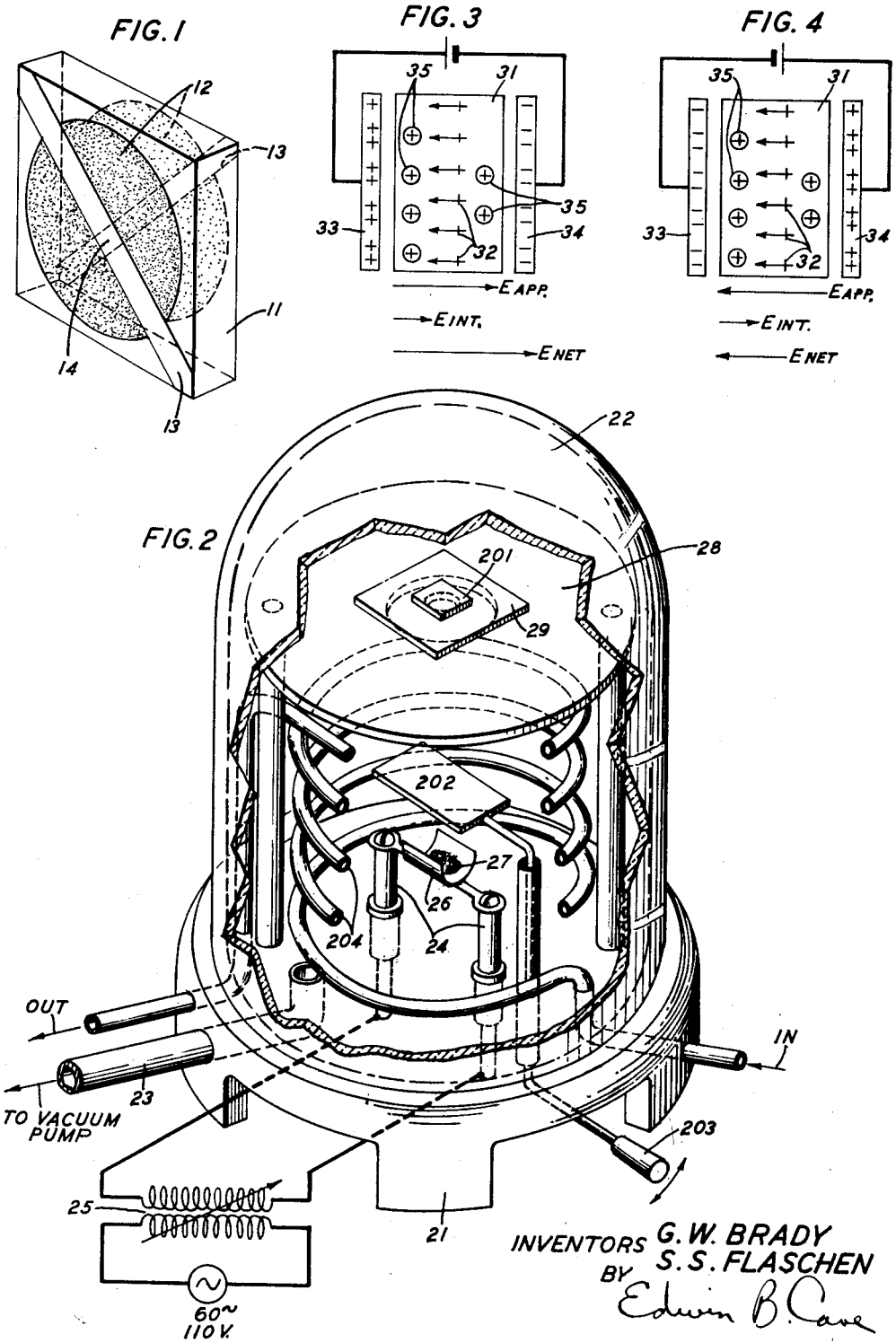

2,916,681

SURFACE TREATMENT OF FERROELECTRIC MATERIALS

George W. Brady, Convent Station, and Steward S. Flaschen, New Providence, N.J., assignors to Bell Telephone Laboratories, Incorporated, New York, N.Y., a corporation of New York Application November 8, 1955, Serial No. 545,742

12 Claims. (Cl. 317—262)

This invention relates to methods for altering the chemical nature and electrical properties of the surface layers of ferroelectric substances, to the ferroelectric materials so treated, and to devices using the treated ferro-electric substances.

Ferroelectric substances are those having extremely high dielectric constants and exhibiting hysteresis loops between electric field and polarization, indicative of spontaneous polarization phenomena. These materials, analogous to ferromagnetic substances, have electric domains, as ferromagnetic materials have magnetic domains, which electric domains may be modified, reshaped or reoriented in the presence of an electric field much as magnetic domains are similarly susceptible to the influence of magnetic fields. A discussion of the order-disorder and displacive transitions responsible for the behavior of ferroelectric crystals is to be found in the paper of Bernd T. Matthias, entitled "Ferroelectricity," published in Science, May 25, 1951, volume 113, No. 2943, pages 591 through 596.

When electrodes are affixed to opposite faces of a ferroelectric crystal and an electric field is created by application of a potential across the electrodes, orientation of the spontaneously polarized domains in the crystal under the influence of the field occurs. Once the domains have been oriented in that portion of the crystal in the vicinity of the electrodes, the later application of a potential across the electrodes can elicit one of two possible responses from the crystal.

If a voltage subsequently applied to the crystal creates a sufficiently strong field opposite in direction to that field which has previously oriented the electric domains, a 180 degree reversal of the domain orientation ensues, giving rise to a "polarization current" in the biasing circuit. This current is observed as a pulse at the moment of the reversal of the dipoles.

However, if the applied voltage creates a field the same in direction as the field which has earlier oriented the domains, no such polarization current should be observed, since the domains remain aligned in the stable position of least energy which they previously assumed. In practice, a small current is often observed in the latter case, as well as in the former for which a 180 degree reversal occurs. The magnitudes of the currents observed, are, however, quite different: a ratio of 10 to 1 or larger is typical for the magnitude of the currents found upon application of potentials of opposite sign to an oriented crystal. The small current, proportional to the remanence of the crystal, is due to the further polarization of the already oriented crystal in the applied field. This polarization is similar in cause and magnitude to the dielectric effect found in non-ferroelectric materials, and, as in those materials, is small in comparison with the spontaneous polarization otherwise characteristic of ferroelectric substances.

The spontaneous polarization and the two differing possible responses of a ferroelectric crystal to an applied pulse, as described above, permit the use of the material, for example, as a storage unit for information coded in a binary system. The operation of such a ferroelectric storage device, and a circuit in which the device is useful are described in United States Patent 2,695,396, issued November 23, 1954 to J. R. Anderson.

Untreated single crystals of some ferroelectric substances, however, when subjected to high-frequency voltage pulsing, tend to show a change in their response to such pulsing after relatively short periods of time, particularly if pulses of alternate sign, interrupted by irregular rest periods between pulses, are applied. Such "decay" of the crystal is due to reduced polarization of the crystal because of failure of the domains to orient in the applied field, and is characterized by a decreased polarization current flow observed when the bias voltage is of proper sign to produce a 180 degree reversal of the electric domains.

The ratio of the polarization current observed when such 180 degree reversal is at least nominally accomplished, to that obtained when the biasing voltage is of such sign that no polarization current due to reversal should normally occur, tends to become smaller as a consequence of such incomplete orientation. This decrease in current ratio leads, operationally, to an increased indistinguishability between differing responses of the crystal: if the current ratio falls beneath the value of 10 to 1, mentioned earlier as an ideal minimum value for the ratio, detecting apparatus may be unable to distinguish a reversal response from a non-reversal response. Since the utility of the crystal as a storage device lies largely in its ability to give one or the other of two different identifiable electrical reactions to an applied pulse, decay phenomena are detrimental to a maximum utilization of this unique property of ferroelectric substances.

As is later explained, the decay of ferroelectric single crystals is apparently a surface phenomenon brought about by electrolytic reactions in the crystal in the surface regions immediately surrounding the electrodes affixed to the crystal. The invention described herein teaches methods of treating the surfaces of ferroelectric materials to improve the stability of their performance under rigorous pulsing conditions. These techniques convert the surface layers into insulating materials resistant to electrolytic reaction, rendering the remaining portions of the crystal less subject to those changes which lead to loss of crystal sensitivity, described as "decay."

In the accompanying drawings:

Fig. 1 is an enlarged perspective view of a ferroelectric crystal, with electrodes affixed, the faces of which crystal have been converted in part by the methods of the invention described herein into an insulating, electrochemically inert material;

Fig. 2 is a perspective view, partly in section, of a coating chamber which has been found of particular usefulness in depositing thin films of metal or of insulating non-ferroelectric materials on the surfaces of ferroelectric crystals; and Figs. 3 and 4 are schematic views of ferroelectric crystals having space charges therein, which figures show the effect of such space charge on the orientation of ferroelectric domains within the crystals under the influence of different applied biasing voltages.

In Fig. 1 is shown a wafer 11 of a ferroelectric substance, for example barium titanate, the faces of which have been coated with a thin layer 12 of an insulating non-ferroelectric material, for example titanium dioxide. Across each face metallic electrodes 13, which may be of fixed silver paste or deposited platinum for example, have been laid. In the central portion 14 of the crystal, where the crossed electrodes intersect including a common volume of the coated crystal between them, is the region in which the electrodes set up a field between them perpendicular to the large faces of the crystal 11. This field is responsible for orientation of the ferroelectric domains in that portion of the crystal within the field.

In Fig. 2 is shown a chamber, capable of being highly evacuated, comprising a base 21, conveniently of metal, and an air-tight covering 22, conveniently of a transparent material such as glass or plastic. An outlet 23 which pierces base 21 and connects to a vacuum line permits the evacuation of gases from the chamber. Terminals 24 are mounted in the chamber through airtight seals. Exteriorly, the terminals 24 are connected with a variable transformer 25, the primary coil of which most commonly carries a 110-volt 60-cycle alternating current.

Within the chamber, means including a boat 26 or shallow container fashioned of a metal such as tungsten bridge the terminals 24. A quantity of material 27, to be vaporized by the passage of an electric current through the terminals 24 and the boat 26 in electrical contact therewith, rests in said boat 26.

Means comprising a perforated platform 28 and perforated foil 29 are provided to suspend a crystal 201 of the ferroelectric to be coated over the coating material 27.

A shield 202, conveniently of metal, is provided within the chamber so that a temporary barrier may be interposed between the vapors of the coating material 27 and the surface of the crystal 201. The shield 202 may be moved from without the chamber by a control 203.

Coils 204 may be provided through which a coolant such as liquid nitrogen may be passed as the coating procedure is carried out. Such low-temperature coils serve to condense small amounts of gas or oil vapor not removed from the system by the vacuum pumps.

The details of Figs. 3 and 4 are discussed in the text following.

The changes brought about in the crystal by pulsing with asymmetric rest periods between pulses of alternate sign may be explained by hypothesizing an electrolytic conversion of oxygen ions in the crystal to oxygen atoms with loss of electrons to the adjoining electrode and into the circuit. This conversion occurs at those surface layers of the crystal in apposition to the positive electrode. As long as the field is maintained in the crystal, atomic oxygen so produced at the electrode-crystal interface may be polarized by the high field strength found in the vicinity of the electrodes. Such polarization produces atomic oxygen dipoles adhering to the electrode face and having little mobility as long as the polarizing field is maintained.

At that face which is in contact with the positive electrode during any pulse then, oxygen ions are presumably converted to oxygen atoms according to $$2\ O^= \rightarrow 2\ O\ (\text{atomic}) + 4\ \text{electrons}$$

As long as the applied field is maintained, the oxygen atoms so produced will be immobolized by polarization in the field and electrostatic attraction of the resultant dipoles to the electrode face. If now a pulse of opposite sign is applied, making the formerly positive electrode negative without an intervening rest period during which no field is maintained, the electrochemical reaction given above is reversed and oxygen ions may be returned to the crystal after reduction by electrons flowing through the electrode.

If the field is shut off, as in a rest period between pulses, however, the oxygen atoms, mobile after release from the electrode face, combine to form the thermodynamically more stable molecular species:

$$2\ O\ (\text{atomic}) \rightarrow O_2$$

Though the electrolytic conversion of oxygen ions to atomic oxygen may be a reversible process, the dissociation of molecular oxygen to atomic oxygen is so slow at normal temperatures as to render the combination reaction of atoms to molecules taking place at an electrode a virtually irreversible reaction. When a later, negatively biased, pulse is applied, then, the newly negative electrode finds little electrochemically-reactive atomic oxygen in its vicinity, but, rather, only electrochemically slowly reactive molecular oxygen.

If, finally, the rest periods between alternate equal pulses of opposite sign are of different length, the reaction $$2\ O\ (\text{atomic}) \rightarrow O_2$$

may take place to a different extent at each face. In consequence the amount of atomic oxygen available for reaction according to $$4\ \text{electrons} + 2\ O\ (\text{atomic}) \rightarrow 2\ O^=$$

at the two, alternately negative, electrodes differs. While substantially equal amounts of ionic oxygen and negative electronic charge are thus removed from each face when the adjoining electrode is positive, when the same electrode is negative differing numbers of oxygen ions and electrons are returned to the crystal face. After a short period of such pulsing, unequal positive space charge in the crystal face can develop, and such unequal unneutralized positive charge within the ferroelectric substance seems directly responsible for decay.

The effect of an equal space charge in the crystal on switching efficiency can be understood by reference to Fig. 3 and Fig. 4 of the drawings above. Fig. 3 shows schematically a ferroelectric body 31 whose domains are oriented, as indicated by symbols 32, in a direction opposite to that of an electric field applied to the crystal through biased electrodes 33 and 34. In this orientation the domains are in a stable configuration of minimum energy. Within the crystal 31, at the electrodes, previous pulsing has established a positive space charge 35, unequal at the two faces, which creates an internal electric field also influencing domain orientation. The magnitude and direction of the net field, a resultant of the applied and internal fields, on the domains is indicated schematically by the arrows beneath the figure.

In Fig. 4, the field applied between electrodes 33 and 34 has now been reversed in direction. The internal field created by the unequal positive space charge 35 remains unchanged, at least initially. The internal field now, however, opposes the applied field, resulting in a net field too weak to elicit a reversal response from the ferroelectric domains 32. The resultant loss in crystal response is "decay."

Upon a moment's reflection, it can be seen that equal space charge at each crystal face should have no effect in changing the effective strength of the applied field, which is in concert with the observation that alternating pulses will not readily produce decay if symmetric rest times are maintained between the pulses. Rest times of equal duration, though not necessarily preventing the creation of space charge in the crystal, lead at least to the development of nearly equal charges at each electrode.

As the problem of decay is one which may involve the electrolytic reaction of oxygen ions too loosely bound within a ferroelectric crystal, any ferroelectric substance containing oxygen may be susceptible to decay phenomena. Ferroelectric alkali tantalates and niobates are exemplary of such substances, but the relative ease with which ferroelectric barium titanate may be obtained as a single crystal suitable for use in information storage or other practical devices renders a solution to the problem of decay most pressing with respect to this last-mentioned substance. However, the undesired reactivity of ions in the surface layers of a crystal lattice may be a common flaw hindering the practical utilization of single crystals of any ferroelectric materials containing such loosely bound ions, whether the reactive ions are those of oxygen or of other elements which behave as oxygen under pulsing. In consequence, techniques analogous to those specifically described herein for treating barium titanate single crystals are intended also to be applicable to those other ferroelectric materials in which decay is evidenced.

As the explanation of decay presented just above is in part the speculation of theory, it is not to be construed as limiting the scope of the techniques for preventing decay herein disclosed. The mechanistic explanations advanced for the decay phenomenon are not all capable of being reduced to direct experimental observation, and later investigation may lead to the development of more perfect theoretical bases for the practical techniques now to be described. It is indisputable however that these techniques have been found effective in rendering ferroelectric materials more free of the troublesome phenomenon of decay, whatever may be the ultimate explanation of the decay mechanism.

Since, however, the reactivity of ions in the surface layers of a ferroelectric material is a scientifically reasonable explanation of the observed "decay" behavior, the novel methods of the present invention are designed to replace the material of the reactive surface layers of the ferroelectric by insulating, electrochemically non-reactive chemical species. Such replacement is, generally, effected either by direct treatment of the ferroelectric substance, with conversion of the reactive ferroelectric compound into an electrochemically stable insulating material, or by interposition of a non-reactive insulating layer between the electrode and the surface of the ferroelectric crystal using various deposition techniques.

Common to all the methods to be described is the desire that the non-reactive nonconducting surface films formed thereby on the ferroelectric be kept as thin as possible, consistent with the aim of preventing electrochemical reaction of the ferroelectric material at the electrodes. As ferroelectric materials are also piezoelectric, a shift in domain orientation may be accompanied by volume changes in the crystal. If too-thick layers of a non-ferroelectric material coat the crystal surface the inflexibility they impart to the whole may "clamp" the ferroelectric substrate, preventing volume change and thus hindering proper function of the crystal as a storage device by hindering reorientation of the electric domains.

Further, the capacitance of the insulating layer is related to the thickness of the layer and the dielectric constant of the insulating material by $$C = \gamma \frac{K}{D}$$

where $C$ = capacitance of layer
$K$ = dielectric constant of material
$D$ = thickness of layer
$\gamma$ = constant of proportionality It can be seen that thick layers of the insulator will tend to be of low capacitance. As the voltage drop across such a layer is inversely proportional to the capacitance of the insulating layer, the voltage drop across a thick low-capacitance layer may be so great that the effective voltage applied to the electric domains is insufficient to bring about any orientation of the domain. To maintain a sufficiently high voltage on the ferroelectric material, then, a high capacitance in the insulating layer is preferably obtained by choosing insulators of high dielectric constant and applying only thin films of such insulating materials on the surface of the crystal.

The ferroelectric single crystals subjected to the techniques to be mentioned are, from considerations of their ultimate use, generally desired in as thin a sheet as is obtainable consistent with a physical strength sufficient for handling without breakage. For barium titanate for example, this optimum thickness is of the order of 2 mils. Dimensions of length and breadth are determined largely by the techniques previously used in the production of the single crystal. Either before or after the surface has been treated by the methods described herein, the crystal may be divided into pieces of the size desired for a particular purpose. The size or thickness of the crystals to be coated is not crucial to the operability of the coating methods per se. As mentioned, other considerations extraneous to the coating process may dictate crystal dimensions however. Thus a minimal crystal size may be required for convenient handling, for example, or too-thick crystals may be unsuitable for switching despite the presence of a beneficial coating.

Exemplary of a method of coating ferroelectric crystals with an electrochemically non-reactive material by direct treatment of the ferroelectric, as applied to barium titanate, is the conversion of the titanate to barium titanium hexafluoride, $BaTiF_6$, by replacement of oxygen in the surface layers of the crystal with fluorine. Such a replacement may be effected by exposure of the crystal surface to vapors of anhydrous hydrogen fluoride or to gaseous elemental fluorine. The greater electronegativity of fluorine, as compared with oxygen, correlates with a greater resistance of the fluoride ion to oxidation. There is thus a resultant lowered susceptibility of the fluoride-containing material to electrochemical reactions in the region surrounding the electrodes.

The conversion of the surface to an insulating non-reactive material by leaching has proved to be an efficient and more convenient method than the replacement technique suggested above. Immersion of barium titanate single crystals in acid serves to leach barium ions from the crystal. A thin film of reacted material, presumably in part titanium hydroxide, is formed on the crystal surface. This film, on drying in air at room temperatures or upon heating at more elevated temperatures, forms titanium dioxide or mixtures thereof with other insulating substances.

For the leaching process, any of the common strong acids may be used. Hydrochloric acid, which leaches barium ions from the barium titanate crystal without further appreciable chemical reaction is to be preferred in treating barium titanate. Other acids, such as nitric acid or sulfuric acid, for example, may react with barium titanate to form insoluble oxynitrate compounds or barium sulfate, respectively. These materials, titanium hydroxide, and perhaps other, unknown, compounds make up the insulating films on barium titanate crystals leached in the acids mentioned. Such mixed films afford as good pretection against reactivity as the more pure titanium hydroxide formed in hydrochloric acid. The latter films are preferred, however, because of the high dielectric constant of the fairly pure titanium dioxide formed therefrom on firing.

As the thickness of the layer of reacted material on the surface of the crystal is best kept within an optimum range of dimensions, factors affecting the rate of etching of the crystal are generally balanced to give an etch-rate conveniently within the control of one practicing the art. Etching is generally done at room temperature, for convenience, and the acid strength is so chosen as to cause leaching of the crystal within not-too-excessive periods of time, but yet at a moderate enough rate to permit an easily controlled variation of the layer thickness of converted material being formed.

Thus, at room temperature, hydrochloric acid solutions with concentrations between 3 normal and 5 normal will give leached layers having a thickness lying in the range of desired magnitudes in 4 to 6 hours. The optimum hydrochloric acid concentration has been found to be 4 normal, this concentration producing layers between about 100 Angstrom units and 200 Angstrom units thick in the period of time mentioned.

Acid stronger than 5 normal will tend to give faster etch rates, with a corresponding loss of control over the process; acid weaker than 3 normal will give a rate inconveniently slow, or may produce no etching. Slower etch rates using stronger acid may be obtained by a lowering of the temperature, or faster etching with weak acid achieved by raising the temperature if there is prospective advantage to either of these processes when compared with the room-temperature etch.

After a layer of converted material of the desired thickness has been formed in the acid bath, the crystals are dried in clean air at room temperature, or, in an alternative treatment, baked at an elevated temperature till thoroughly dried and sintered. Baking, usually done at a temperature between 300° C. and 500° C., and preferably between 300° C. and 400° C., will produce a highly adherent insulating film. Air drying at room temperature gives a smooth film free of cracks. Drying times are not critical in either case, provided that thorough drying is effected. Baking at the temperatures mentioned usually requires about 16 hours to 20 hours.

Treatment of the crystals after either of the drying procedures mentioned above comprises "poling" or orientation of the ferroelectric domains in an applied field, a wash in ethyl alcohol, and vacuum drying of the alcohol-washed crystals at room temperature at a pressure of $10^{-6}$ millimeters of mercury.

Non-reactive insulating layers of non-ferroelectric materials may also be put on the surface of electrochemically reactive ferroelectric substances by a number of deposition techniques. Direct evaporation of insulating substances may be accomplished by vacuum deposition techniques known in the art, for example. Deposits of aluminum oxide, zirconium dioxide, silicon dioxide, and magnesium fluoride, among others, may be laid directly on the surface of ferroelectric crystals in this manner. Films of titanium dioxide may also be evaporated, though the high dissociation pressure of oxygen over titanium dioxide may require that the films be reoxidized, after deposition by heating in the presence of an oxygen or oxygen-containing atmosphere.

One variant of the general method which has proved especially convenient is that employing the apparatus depicted in Fig. 2 above. Using the apparatus shown, or an essentially equivalent device, the insulating coating material is evaporated onto the ferroelectric crystal from an electrically heated boat fashioned from a refractory substance such as graphite or tungsten. The crystal to be coated is supported, with its broad surfaces exposed, in a vacuum chamber in which the pressure is kept at about $10^{-6}$ millimeters of mercury. Beneath the crystal, a limited amount of the material to be deposited is placed in the fold of a creased tungsten sheet for example, to which sheet electrodes have been affixed to permit the passage of electric current through the receptacle so formed by folding. Current passed through the tungsten heats the tungsten receptacle and its contents, evaporating the latter, which then subsequently redeposit on the compartively cool surfaces of the crystal, coating said surfaces with the dielectric substance as was desired.

The temperature required for the process varies with the substance being evaporated and the pressure maintained in the chamber. Deposition usually occurs at a temperature considerably below the normal boiling point of the material being evaporated: once the material is liquefied, evaporation commences, reaching a significant rate when the partial vapor pressure of the substance exceeds the residual pressure of other gases remaining unremoved from the incompletely evacuated chamber. Both the degree of vacuum maintained and the nature of the dielectric substance are thus important in determining the temperature at which effective deposition occurs.

Though temperatures as high as 3000° C. can be obtained using a tungsten boat as a heater, evaporation of the dielectric materials previously mentioned generally occurs between 1500° C. and 2000° C. when vacuums of $10^{-6}$ millimeters of mercury are maintained, and temperatures between 1500° C. and 1700° C. are often sufficient. Temperature control is afforded by a regulation of the current flowing through the heating circuit.

Since deposition is rapid, often occurring within seconds, control of the thickness of the insulating layers is generally maintained by evaporating a calculated amount of deposited material. The mass of the deposit to be laid is reckoned from the area of the crystal to be covered, the thickness of the deposit wanted, and density measurements. An empirically determined geometrical factor is applied to determine that total weight of material which must be evaporated to give the deposit of desired mass, and hence, thickness on the crystal surface. The thickness of the layer of insulator to be deposited will depend on the dielectric constant of the material. As mentioned, for titanium dioxide, layers between 100 Angstrom units and 200 Angstrom units thick are acceptable.

A second deposition method, similar in some respects to the first, involves the deposition of a metallic film on the surface of the crystal, with subsequent oxidation of the metal to an insulating oxide.

Techniques for depositing thin aluminum films by evaporation in vacuum are known, for example, and subsequent conversion of an applied aluminum film to a film of aluminum oxide can be brought about by heating at 500° C. to 800° C. in an oxidizing atmosphere. In the deposition of metals, heating is most conveniently done by passing a surge of current through a filament of the metal to be evaporated, the heat generated by the passage of the current being sufficient to vaporize the conducting filament. Aluminum, as mentioned, is a conducting metal with an oxide having the proper insulating characteristics, and is well-suited to use in the method just described. Other metals, for instance titanium, with oxides of high dielectric constant may also be used to advantage. As known in the art, apparatus such as that shown in Fig. 2 can be used to deposit the thin metallic films.

Still another method of forming an insulating film on the surface of a ferroelectric crystal involves the application of an organometallic compound to the crystal surface. For example, films of titanium dioxide may be laid on a surface by dipping or spraying the crystal to be coated with an alcoholic solution of tetrabutyltitanate or tetraisopropyl titanate. The organic coatings are then either air dried or fired. Other films of insulating oxides can be obtained by decomposing organic compounds of the metals whose oxides are wanted. Tetraethylsilicate, as a further example, may be decomposed after application to the crystal to a silicon dioxide film.

The specific examples given herein of techniques for coating ferroelectric crystals are intended to be illustrative only, and should not be construed as limiting on the scope and spirit of the invention.

What is claimed is:

1. A single crystal of ferroelectric material subject to decay on pulsing having on its surface an adherent thin layer of insulating, substantially electrochemically inert, non-ferroelectric material which is a member of the class consisting of metal oxides and metal fluorides, which layer renders the underlying ferroelectric material resistant to decay on pulsing.

2. A single crystal of barium titanate having on its surface an adherent thin layer, between 100 Angstrom units and 200 Angstrom units in thickness, of an insulating, substantially electrochemically inert, non-ferroelectric material which is a member of the class consisting of metal oxides and metal fluorides, which layer renders the underlying barium titanate resistant to decay on pulsing.

3. The crystal as described in claim 2 for which said insulating material is magnesium fluoride.

4. The crystal as described in claim 2 for which said insulating material is titanium dioxide.

5. An electrical device comprising a single crystal of ferroelectric material subject to decay on pulsing, having on its surface an adherent thin layer of insulating, non-ferroelectric material which is a member of the class consisting of metal oxides and metal fluorides, which layer renders the underlying ferro-electric material resistant to decay on pulsing, and metal electrodes in contact with said thin layer.

6. An electrical device comprising a single crystal of ferroelectric barium titanate having on its surface an adherent thin layer of insulating non-ferroelectric material, which is a member of the class consisting of metal oxides and metal fluorides, which layer renders the underlying barium titanate resistant to decay on pulsing, and metal electrodes in contact with said thin layer.

7. The device as described in claim 6 for which said thin layer is a layer of titanium dioxide between 100 Angstrom units and 200 Angstrom units in thickness.

8. The method of coating ferroelectric single crystals of barium titanate which comprises immersing said crystals for from four hours to six hours in a solution of hydrochloric acid whose concentration lies between 3 normal and 5 normal, and then drying said crystals in air.

9. The method of coating ferroelectric single crystals of barium titanate which comprises immersing said crystals for from four hours to six hours in a solution of hydrochloric acid whose concentration lies between 3 normal and 5 normal, and then drying said crystals at a temperature between 300° C. and 500° C. for from sixteen hours to twenty hours.

10. The crystal as described in claim 2 for which said insulating material is aluminum oxide.

11. A single crystal of a ferroelectric material including electrochemically active ions in the surface layers thereof, which material is thus of a type subject to decay on pulsing, said material having on each of two distinct surface portions thereof an adherent thin layer of insulating, substantially electrochemically inert, non-ferroelectric material which is a member of the class consisting of metal oxides and metal fluorides, which layer renders the underlying ferroelectric material resistant to decay on pulsing.

12. A single crystal of barium titanate having on each of two distinct surface portions thereof an adherent thin layer of insulating, substantially electrochemically inert, non-ferroelectric material which is a member of the class consisting of metal oxides and metal fluorides.

References Cited in the file of this patent

UNITED STATES PATENTS

| | | |
|---|---|---|
| 2,122,512 | Calkins et al. | July 5, 1938 |
| 2,618,579 | Brajer | Nov. 18, 1952 |
| 2,673,949 | Khouri | Mar. 30, 1954 |
| 2,709,765 | Koller | May 31, 1955 |

OTHER REFERENCES

Titanium by Barksdale, J. Ronald Press Co., N.Y. © 1949, p. 98.

Marks et al.: "K5. The effect of certain Group IV oxides on the Permitivity and Loss Tangent of Barium Ttitanate." Physical Review 2d Ser., vol. 85, page 723 (1951).

Chemical Abstracts 47, 109298 (1953).